Dec. 16, 1969 D. A. MEIER 3,484,762
TWO ELEMENT PER BIT MEMORY HAVING NON-DESTRUCTIVE
READ OUT AND TERNARY STORAGE CAPABILITY
Filed June 27, 1966 7 Sheets-Sheet 1

INVENTOR
DONAL A. MEIER
BY Louis A Kline
John J. Matlago
Nathan Cass
HIS ATTORNEYS Dec. 16, 1969 D. A. MEIER 3,484,762

TWO ELEMENT PER BIT MEMORY HAVING NON-DESTRUCTIVE READ OUT AND TERNARY STORAGE CAPABILITY

Filed June 27, 1966 7 Sheets-Sheet 2

INVENTOR
DONAL A. MEIER

BY Louis A. Kline
John J. Maclago
Nathan Cass
HIS ATTORNEYS

INVENTOR
DONAL A. MEIER

BY Louis A. Kline
John J. Matlago
Nathan Cass
HIS ATTORNEYS

FIG. 5
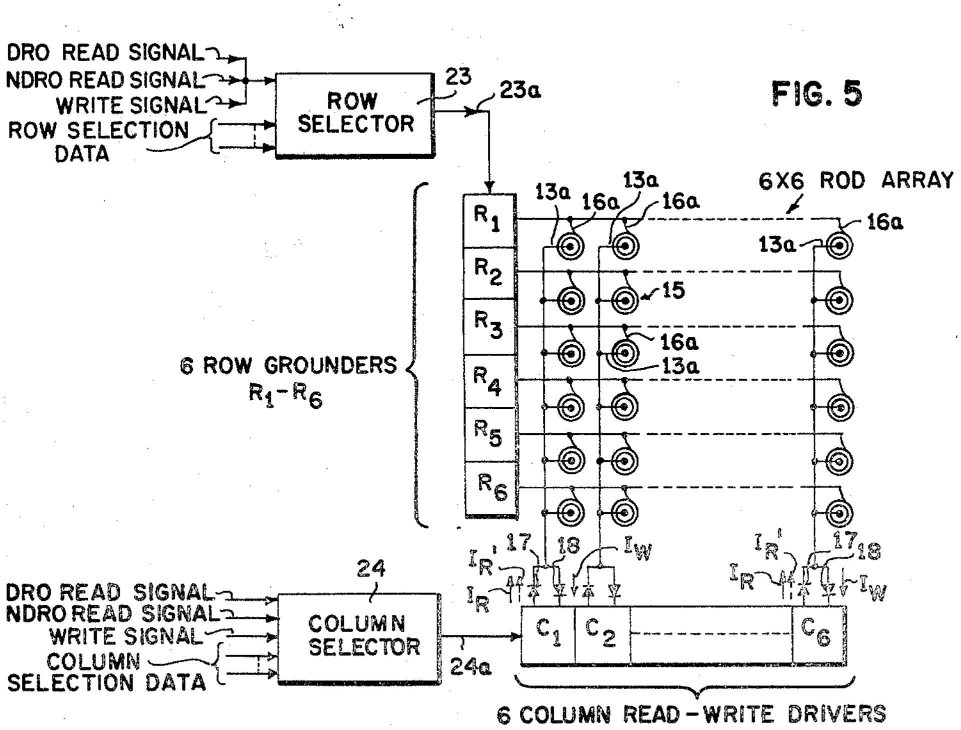
FIG. 6, FIG. 7
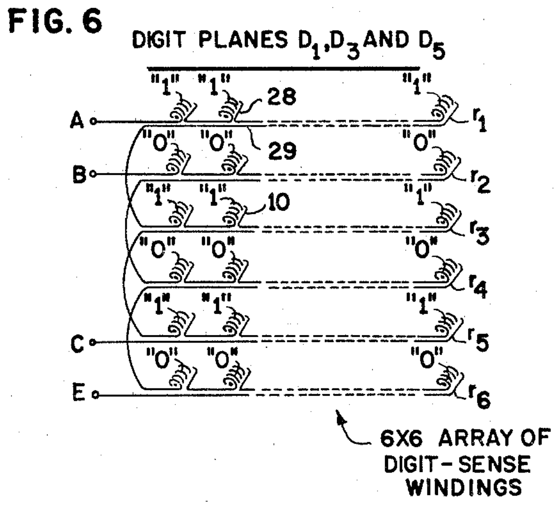
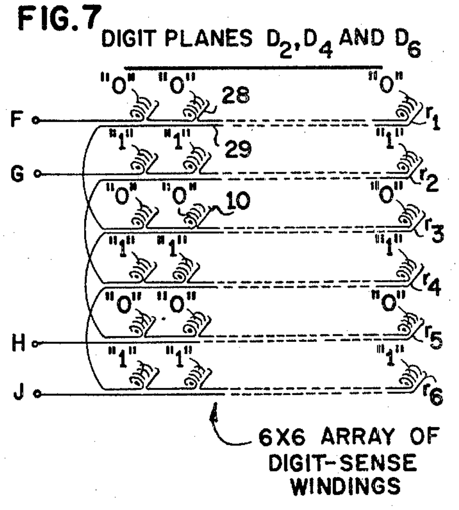
FIG. 8
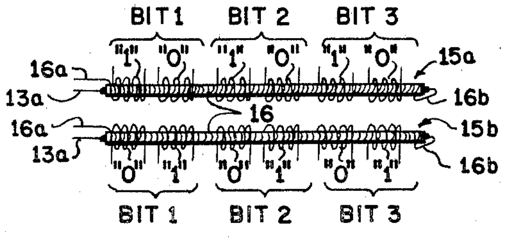
INVENTOR
DONAL A. MEIER
BY Louis A. Kline
John J. Matlago
Nathan Cass
HIS ATTORNEYS

INVENTOR
DONAL A. MEIER

BY Louis A. Kline
John T. Matlago
Nathan Cass
HIS ATTORNEYS

WORD IN BINARY FORM — EQUIVALENT WORD IN TERNARY FORM — INPUT TO DIGIT DRIVERS
"0" = DRIVER UNACTIVATED
"1" = DRIVER ACTIVATED TO PRODUCE AN AIDING DIGIT CURRENT

| $B_3$ | $B_2$ | $B_1$ | $T_2$ | $T_1$ | $D_4$ | $D_3$ | $D_2$ | $D_1$ |
|---|---|---|---|---|---|---|---|---|
| 0 | 0 | 0 | 0 | 0 | 0 | 0 | 0 | 0 |
| 0 | 0 | 1 | 0 | 1 | 0 | 0 | 0 | 1 |
| 0 | 1 | 0 | 1 | 0 | 0 | 1 | 0 | 0 |
| 0 | 1 | 1 | 1 | 1 | 0 | 1 | 0 | 1 |
| 1 | 0 | 0 | -1 | 0 | 1 | 0 | 0 | 0 |
| 1 | 0 | 1 | -1 | 1 | 1 | 0 | 0 | 1 |
| 1 | 1 | 0 | 1 | -1 | 0 | 1 | 1 | 0 |
| 1 | 1 | 1 | -1 | -1 | 1 | 0 | 1 | 0 |

INVENTOR
DONAL A. MEIER

BY Louis A. Kline
John J. Matlago
Nathan Cass
HIS ATTORNEYS

SENSE AMP. OUTPUT SIGNALS
"1" = SIGNAL OCCURS
"0" = NO SIGNAL

| SENSE AMP. OUTPUT SIGNALS | | | | EQUIVALENT TERNARY DIGIT | | EQUIVALENT BINARY DIGIT | | |
|---|---|---|---|---|---|---|---|---|
| $e_2^-$ | $e_2^+$ | $e_1^-$ | $e_1^+$ | $T_2$ | $T_1$ | $M_3$ | $M_2$ | $M_1$ |
| 0 | 0 | 0 | 0 | 0 | 0 | 0 | 0 | 0 |
| 0 | 0 | 0 | 1 | 0 | 1 | 0 | 0 | 1 |
| 0 | 1 | 0 | 0 | 1 | 0 | 0 | 1 | 0 |
| 0 | 1 | 0 | 1 | 1 | 1 | 0 | 1 | 1 |
| 1 | 0 | 0 | 0 | -1 | 0 | 1 | 0 | 0 |
| 1 | 0 | 0 | 1 | -1 | 1 | 1 | 0 | 1 |
| 0 | 1 | 1 | 0 | 1 | -1 | 1 | 1 | 0 |
| 1 | 0 | 1 | 0 | -1 | -1 | 1 | 1 | 1 |

INVENTOR
DONAL A. MEIER

BY Louis A. Kline
John J. Matlago
Nathan Cass
HIS ATTORNEYS 3,484,762

TWO ELEMENT PER BIT MEMORY HAVING NON-DESTRUCTIVE READ OUT AND TERNARY STORAGE CAPABILITY

Donal A. Meier, Inglewood, Calif., assignor to The National Cash Register Company, Dayton, Ohio, a corporation of Maryland Filed June 27, 1966, Ser. No. 560,478
Int. Cl. G11b *5/00*
U.S. Cl. 340—174 24 Claims

ABSTRACT OF THE DISCLOSURE

A memory system employing thin film rod elements that provides either non-destructive or destructive read out when operated in an axial partially switched mode in a two element per bit organization with either a binary or ternary digit stored in each bit position. The operation produces a positive output signal for the combinational state of one of the elements being partially switched, a negative output signal for the combinational state of the other of the elements being partially switched, and no output signal for the combinational state of neither of the elements being partially switched. When used as a two element per bit ternary digit memory, input conversion means is provided for converting a source of binary data into ternary form for writing a ternary digit in a selected pair of elements by setting the elements to one of the three combinational states, and output conversion means is provided for converting a ternary digit read out of the memory back into binary form.

This invention relates generally to electronic data processing systems and more particularly to magnetic memory devices for use therein.

With the ever increasing use of digital computers, it has become of considerable importance to provide high speed random access memories for use therein, and it is accordingly the broad object of the present invention to provide an improved magnetic memory of this type employing thin film rod elements.

A more specific object of the invention is to provide a magnetic memory capable of high speed operation in both destructive and non-destructive modes of operation.

Another object of the invention in accordance with one or more of the foregoing objects is to provide a magnetic memory which is able to reduce the noise generated therein to extremely low levels.

A further object of the invention in accordance with one or more of the foregoing objects is to provide a highly reliable non-destructive memory employing thin film rod elements operating in the axial mode in a two element per bit memory organization.

Yet another object of the invention in accordance with one or more of the foregoing objects is to provide a two element per bit thin film magnetic rod memory capable of storing a ternary digit in each bit.

A still furthre object of the invention in accordance with the foregoing objects is to provide a memory which combines simplicity and economy with low noise generation and a non-destructive read out capability.

Briefly, the above objects are accomplished in accordance with a preferred embodiment of the invention whose construction and arrangement is based upon the discovery that thin film magnetic rod elements can be caused to provide reliable high speed writing and non-destructive as well as destructive read out when operated in an axial partially switched mode in a well balanced two element per bit organization with either a binary or ternary digit stored in each bit. A 10 megacycle read-write cycle speed and a 20 megacycle non-destructive read cycle speed is achievable in accordance with the invention for both binary and ternary storage.

The specific nature of the invention as well as other objects, uses and advantages thereof will become apparent from the following description of a preferred embodiment of the invention taken in conjunction with the accompanying drawings in which:

FIG. 5 is a schematic and electrical diagram illustrating how the word windings of the rods in the matrix of FIG. 1 may be connected in a linear selection arrangement so as to permit a word winding of a selected rod structure to be selected to receive either a read or a write current;

FIGS. 6 and 7 are schematic partially pictorial views illustrating the connection of the digit-sense windings in each digit plane of the memory of FIG. 1;

FIG. 8 illustrates the bistable magnetic designations provided along an odd row rod structure and an even row rod structure as a result of the digit-sense winding arrangement of FIGS. 6 and 7;

Figures 9, 9A:
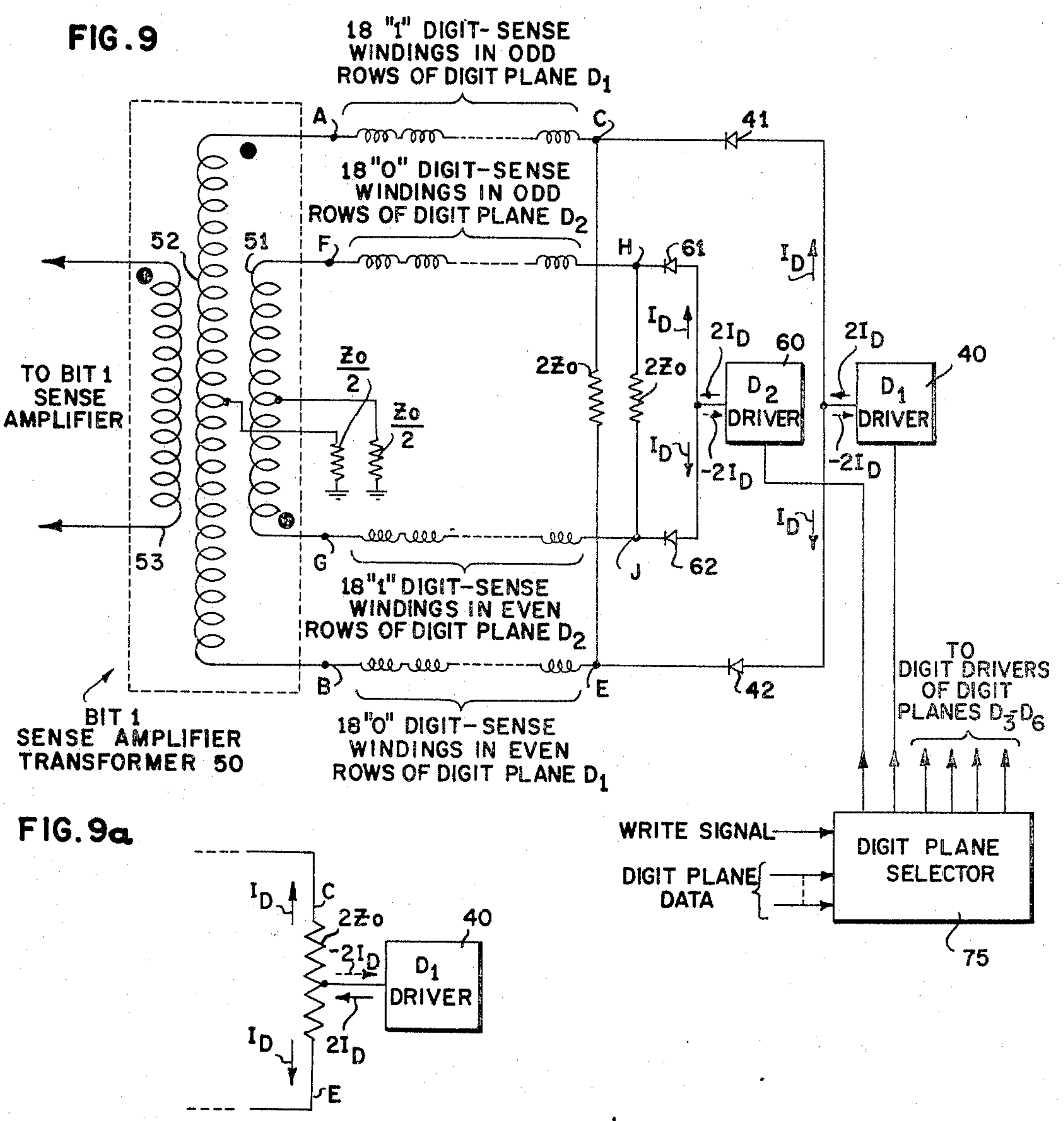
FIG. 9 is an electrical circuit diagram illustrating the connection and arrangement of the digit-sense windings in digit planes $D_1$ and $D_2$ of the memory of FIG. 1 with respect to the sense amplifier coupling means and the digit plane drivers.
Figures 10, 11:
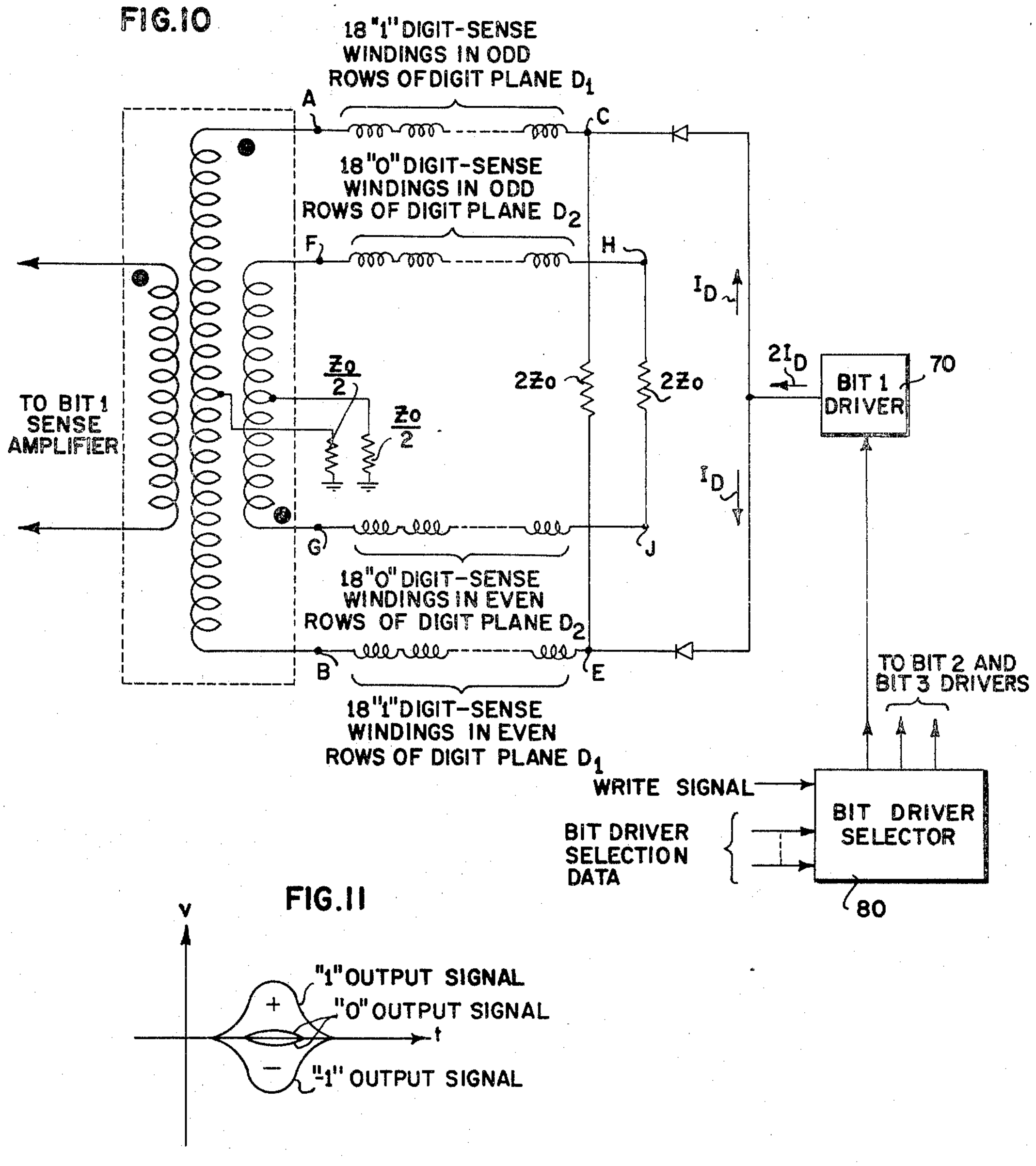
Figures 12, 12A:
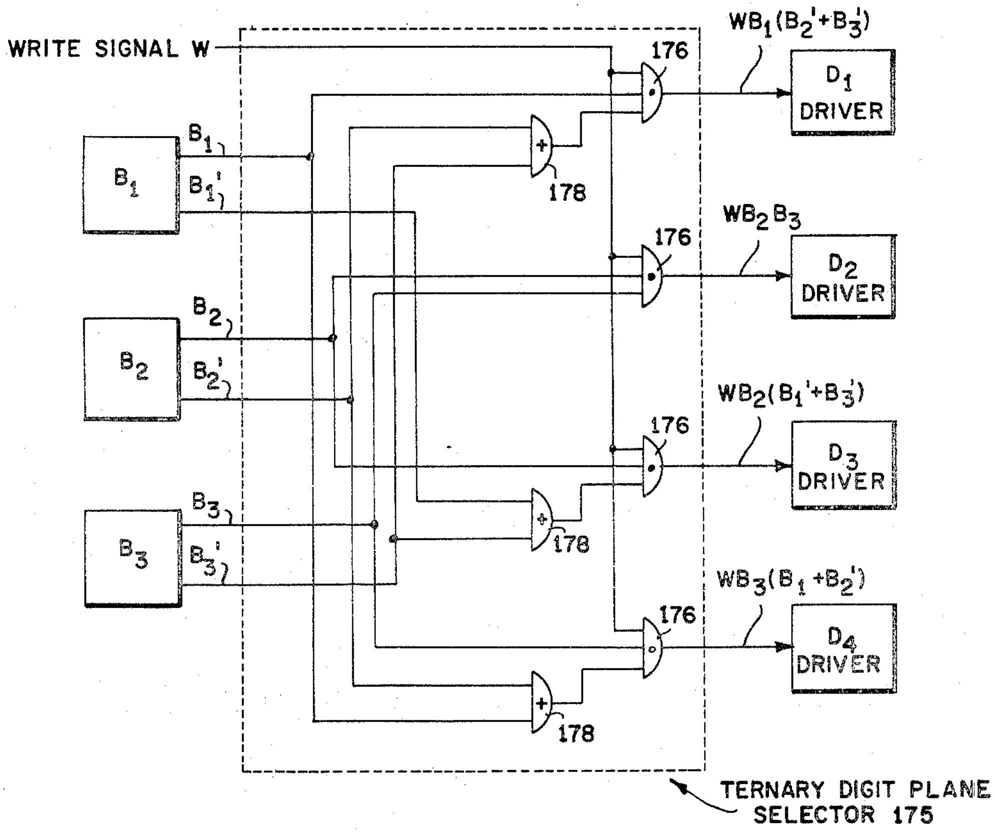
Figures 13, 13A:
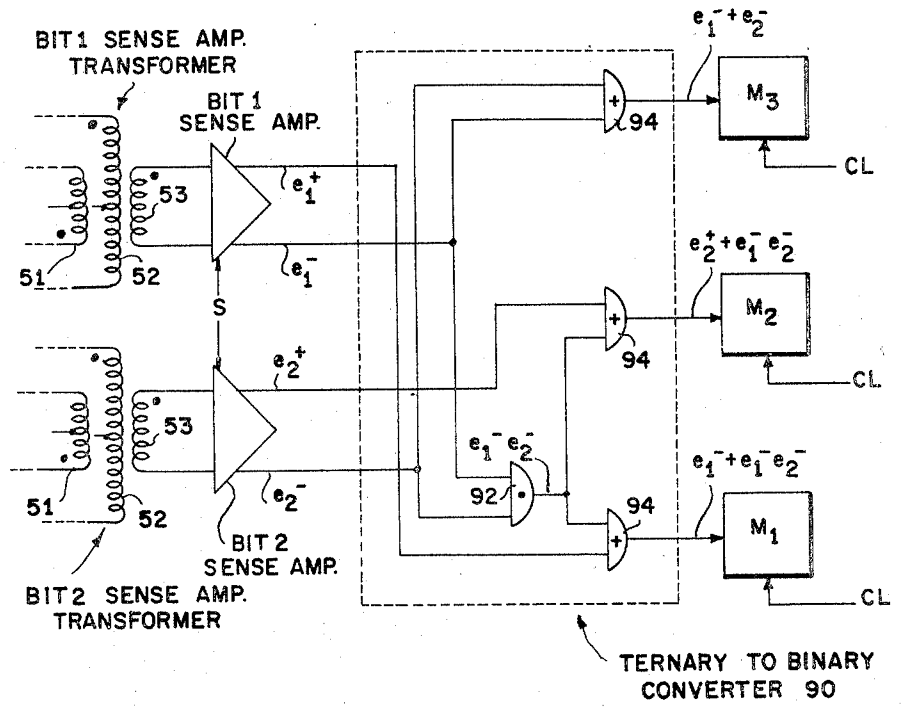

FIG. 9*a* is a fragmentary circuit diagram illustrating a modified digit current driving arrangement which could be employed in the circuit of FIG. 9;

FIG. 10 is an electrical circuit diagram illustrating a modification of the circuit of FIG. 9;

FIG. 11 is a graph illustrating typical output signals obtained when the memory is used for ternary storage;

FIG. 12 is a schematic and electrical diagram illustrating how a word comprised of three binary digits may be written into the memory as two ternary digits;

FIG. 12*a* is a logical table of the combinational logic of FIG. 12;

FIG. 13 is a schematic and electrical diagram illustrating how a word comprised of two ternary digits may be read out of the memory and converted back to binary form; and FIG. 13*a* is a logical table of the combinational logic of FIG. 13.

Like numerals designate like elements throughout the figures of the drawings.

Figure 1:
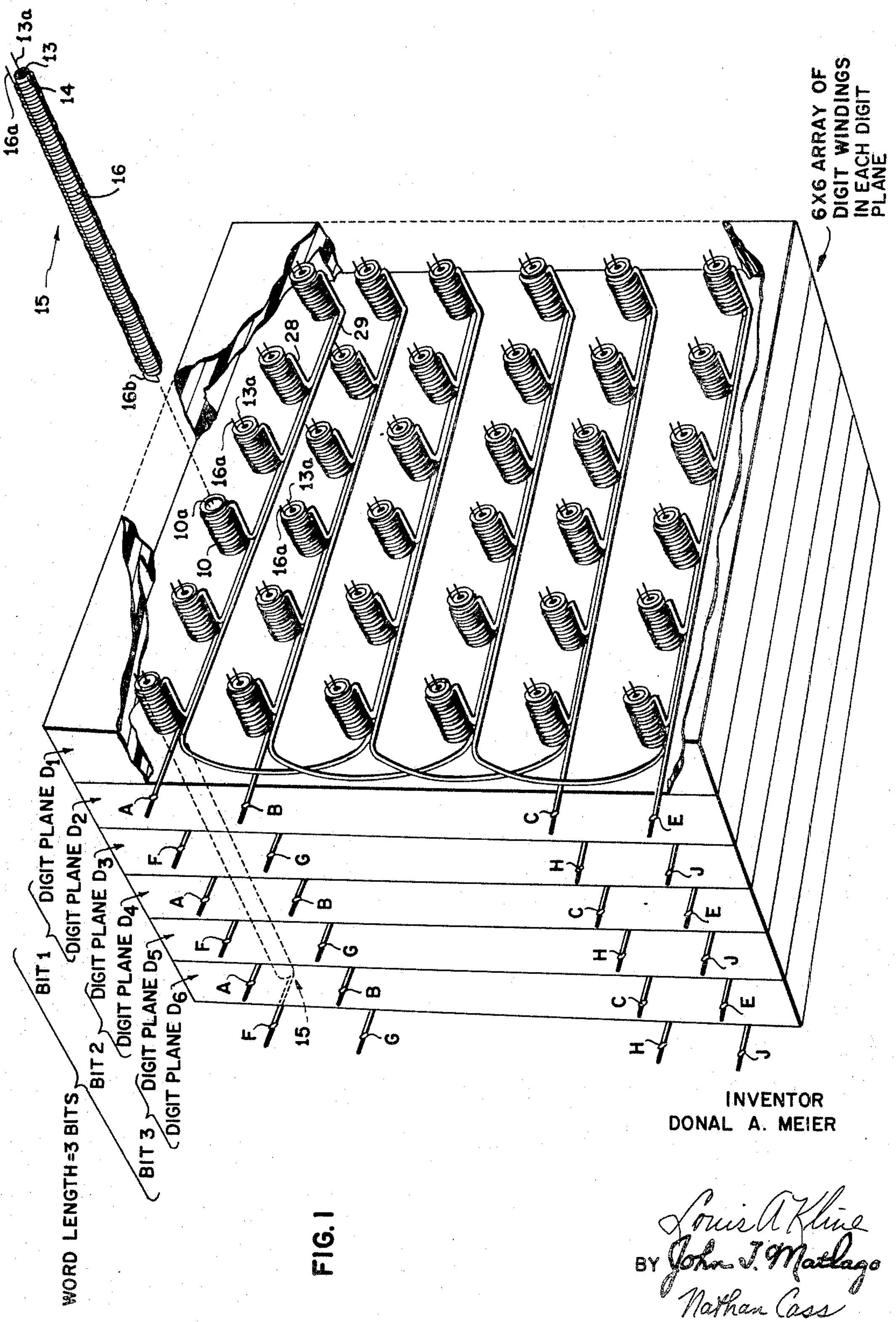
FIG. 1 is an overall pictorial view of a thin film magnetic rod matrix incorporating the present invention, a single typical rod being shown external to the matrix in a position ready for insertion.

FIG. 1 illustrates an exemplary basic overall memory matrix structure which will be seen to be basically similar to that disclosed in the copending commonly assigned patent application Ser. No. 347,184, now U.S. Patent No. 3,315,241, filed Feb. 25, 1964. The exemplary memory structure of FIG. 1 comprises a plurality of digit planes (or plates) $D_1$–$D_6$ which are suitably stacked and secured together in aligned fashion, with rod structures 15 being provided passing perpendicularly through aligned bores provided in respective aligned digit windings in respective digit planes.

Each digit plane may comprise, for example, a 6 x 6 array of electrically interconnected digit-sense windings, and each digit-sense winding is constructed in the form of a solenoid 10 with a cylindrical bore 10*a* provided therein of a diameter preferably just sufficient to permit a respective thin film rod structure 15 and its associated word winding 16 (which is a coaxial helical solenoid) to be passed therethrough.

Figure 2:
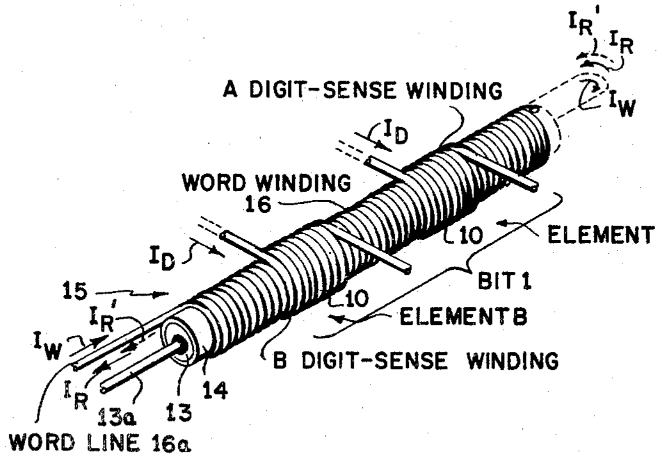
FIG. 2 is a fragmentary pictorial view showing a pair of "0" and "1" digit-sense windings of a typical bit and the respective portion of a rod passing therethrough.

As indicated in FIGS. 1 and 2, each thin film rod structure 15 is preferably comprised of a long thin rod-like inner conductive substrate 13 of beryllium copper having a diameter of about 5–10 mils, and on which is suitably deposited a thin film magnetic coating 14 having bistable magnetic switching properties. The thin magnetic film 14 may typically be an isotropic 500 to 10,000 angstrom electrodeposited coating of an alloy of approximately 97% iron and 3% nickel, or a suitable bilayer of the type disclosed in the commonly assigned copending application Ser. No. 77,451, filed Dec. 21, 1960, now Patent No. 3,213,431, or a permalloy thin film of approximately 80% nickel and 20% iron.

As noted previously, each rod structure 15 contains a coaxial helical solenoid 16 closely wound on the rod which serves as a word winding as will become evident hereinafter. The basic bistable magnetic storage element in the matrix is substantially the portion of the thin film magnetic coating 14 which is in the immediate vicinity of each digit-sense solenoid when the rod structure 15 is inserted in the matrix. Each rod structure, therefore, provides six individual bistable magnetic storage elements which, in a two magnetic element per bit arrangement, provides for the storage of three binary digits, or three ternary digits as will become evident hereinafter. For the purposes of this description a bit will be considered as constituting two magnetic elements capable of storing either a binary or a ternary digit.

The three binary or ternary digits which each rod structure is capable of storing in two magnetic element per bit fashion may be considered to constitute a three bit word. As is well known in the art, a word is merely a convenient designation for a particular group of digits or bits which are handled together. Since there are 36 rods in the exemplary memory matrix shown in FIG. 1, the memory may be referred to as a 36 word memory. Obviously, the memory may be enlarged to store many more words having many more digits per word, the memory illustrated in FIG. 1 being merely exemplary.

The two bistable magnetic elements which are used to represent a binary or ternary digit in the two magnetic element per bit arrangement being employed herein are chosen as adjacent portions on the same rod. Such a choice is highly advantageous since these two adjacent portions can be expected to have very similar magnetic properties as a result of the fact that a rod can be fabricated under continuous, automatic procedures which produce highly uniform thin film coatings, particularly on the same rod, and most particularly on adjacent portions on the same rod. A typical manner in which such automatic fabrication can be provided is described in the article "The Magnetic Rod—A Cylindrical, Thin-Film Memory Element" by D. A. Meier and A. J. Kolk, published on pages 195–212 in the book "Large-Capacity Memory Techniques for Computing Systems," edited by Marshall C. Yovits, The Macmillan Company, New York, 1962.

Referring now to FIG. 2, a fragmentary portion of a rod structure 15 is illustrated corresponding to digit planes $D_1$ and $D_2$ and showing the respective digit-sense solenoids corresponding to bit 1 which are disposed over adjacent portions of the rod and its word winding 16 when the rod structure 15 is inserted in the matrix. The manner in which the two elements A and B constituting the typical bit illustrated in FIG. 2 may be operated to provide reading and writing of a binary or ternary digit for both destructive and non-destructive modes will now be considered with additional reference to the hysteresis loop graphs shown in FIGS. 3 and 4.

Figure 3:
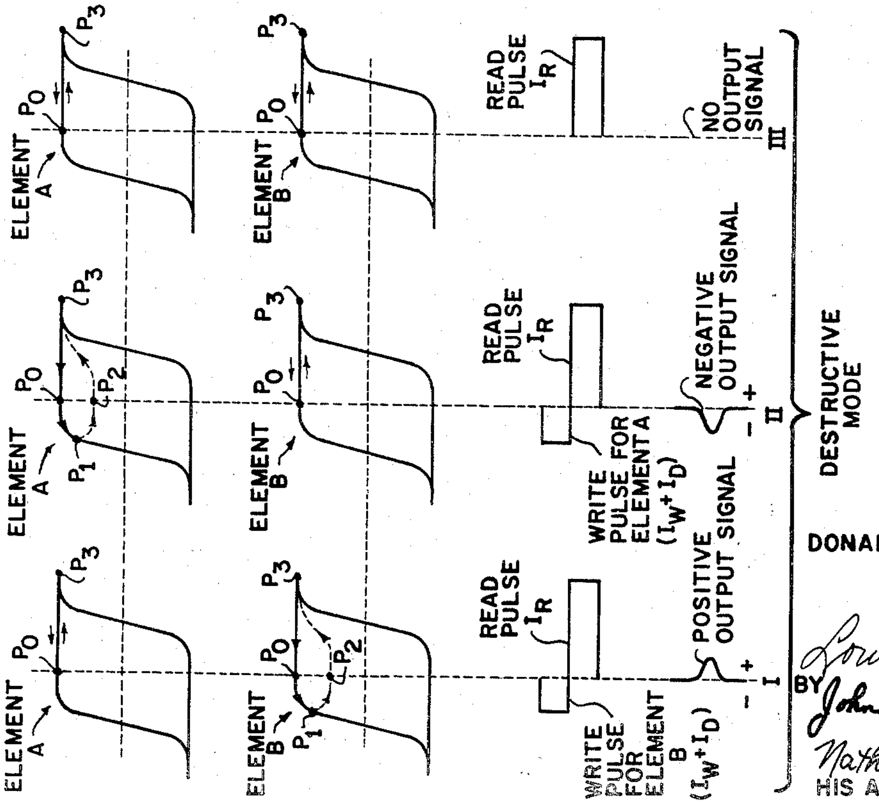
FIG. 3 is a series of graphs illustrating the hysteresis responses of the two elements of a typical bit for a destructive mode of operation.

Referring first to FIG. 3 which corresponds to operation in the destructive mode, illustrated therein are three distinct combinational states which can be written into elements A and B during writing and uniquely sensed during reading, as illustrated by graphs I, II and III. In graph I only element B is partially switched during writing ($P_0 \rightarrow P_1 \rightarrow P_2$) by applying coincident current signals $I_D$ and $I_W$ (neither of which is sufficient by itself to cause partial switching) to its respective digit-sense winding 10 and word winding 16 (FIG. 2); in graph II only element A is partially switched from its read saturation state during writing ($P_0 \rightarrow P_1 \rightarrow P_2$) by applying coincident current signals $I_D$ and $I_W$ to its respective digit-sense winding 10 and word winding 16 (FIG. 2); and in graph III neither element A nor B is switched from their read saturation state during writing ($I_D = 0$). The three combinational states for elements A and B illustrated in FIG. 3 are thus: (1) only element B partially switched, (2) only element A partially switched, and (3) neither A nor B partially switched. A fourth possible combinational state for elements A and B not illustrated in FIG. 3 is one in which both elements A and B are partially switched. However, since this state is indistinguishable during reading from the state in which neither A nor B is switched, and is less desirable from a driving circuit and noise viewpoint, it is not used in the preferred embodiment being described herein. Also, it is to be understood that although full switching could be employed, partial switching is preferred because of its higher speed capability. For such partial switching, a hysteresis loop of squareness ratio greater than 0.8 is preferred.

Still referring to FIG. 3, the three combinational states which may be written into elements A and B can be uniquely sensed by the application of a read pulse $I_R$ to the word winding 16 of elements A and B (FIG. 2) which is sufficient to drive each back to its read saturation state if partially switched. As will be described in detail hereinafter, the respective digit-sense windings 10 of each bit are connected in the memory so that the driving of element B of a bit from its partially switched state back to its read saturation state ($P_2 \rightarrow P_3 \rightarrow P_0$) produces a positive output signal, while the driving of element A of a bit from its partially switched state back to its read saturation state produces a negative output signal, and the driving of an unswitched element in response to the read pulse ($P_0 \rightarrow P_3 \rightarrow P_0$) produces essentially no output signal. Thus, the three possible output indications in response to an applied read pulse are: (1) positive output signal, (2) negative output signal, and (3) no output signal, which respectively correspond to the three states which may be written into elements A and B: (1) only element B partially switched, (2) only element A partially switched, and (3) neither element A nor B partially switched, illustrated in graphs I, II and III, respectively.

It will now be understood that if it is desired that the elements A and B of a bit be used to represent a binary digit, only two combinational states of elements A and B are required to represent the two binary digits which may arbitrarily be designated as "1" and "0." Combinational states I and II are preferred, since it is easier to distinguish between positive and negative output pulses than between an output pulse and no output pulse. If it is desired that the elements A and B of a bit used to represent a ternary digit, then all three combinational states I, II and III of elements A and B are required to represent the three ternary digits which may arbitrarily be designated as "1," "0" and "−1."

Figure 4:
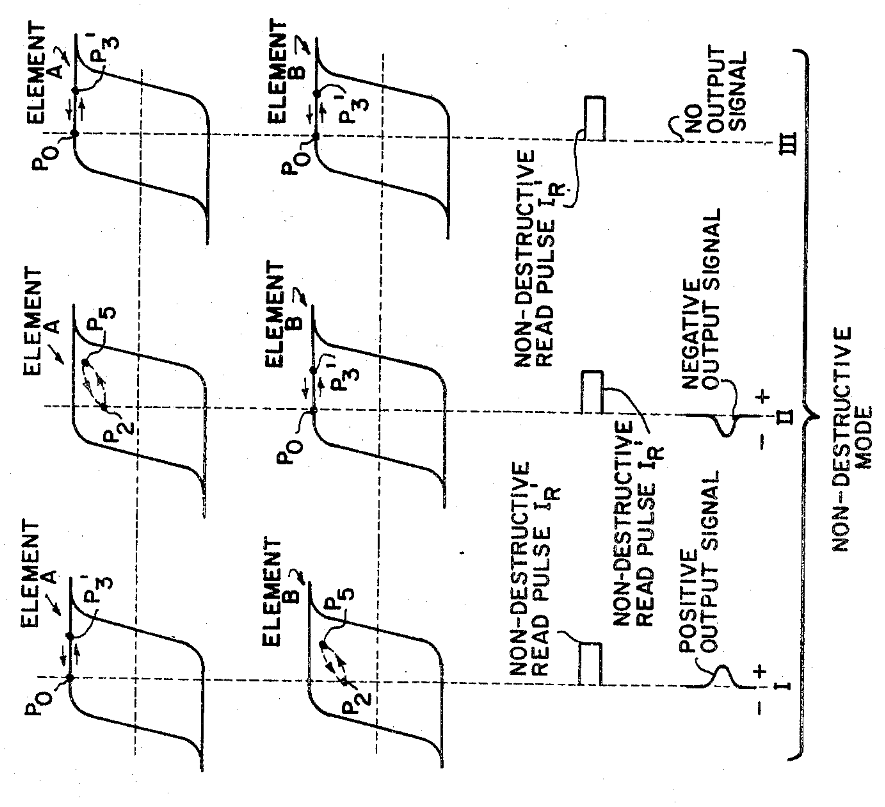
FIG. 4 is a series of graphs illustrating the hysteresis responses of the two elements of a typical bit for a non-destructive mode of operation.

Considering now the non-destructive mode illustrated in FIG. 4, it will be understood that any of the three combinational states of FIG. 3 may be written into elements A and B of the typical bit shown in FIG. 2. FIG. 4 shows how each of the three combinational states may be read in a non-destructive manner in accordance with the invention, graphs I, II and III corresponding to the same combinational states in both of FIGS. 3 and 4. Non-destructive read out is accomplished by applying a read pulse to the word winding 16 (FIG. 2) of elements A and B (FIG. 2) as is done for destructive read out. However, for non-destructive read out, the read pulse $I_R'$ is chosen so as to cause a partially switched element (residing at $P_2$) to only momentarily be driven out of its partially switched state and to return to its partially switched state when the read pulse $I_R'$ is removed ($P_2 \rightarrow P_5 \rightarrow P_2$). It is significant to note that such non-destructive operation is primarily based on the difference in incremental permeability between the states of elements A and B and not on a rotation of the magnetization vector as is used to obtain a non-destructive capability in certain prior art memories.

Generally, such non-destructive operation based on the difference in incremental permeability between the states of elements A and B is difficult to utilize because: (1) only a relatively small flux change and thus a small output signal is ordinarily to be expected, (2) it is difficult to obtain a sufficiently low noise level in a memory to permit reliable detection of the non-destructive output signal, and (3) it is difficult to avoid disturb effects which would cause a partially switched element to step back to its unswitched state after a given number of applied read pulses. In accordance with the present invention, it has been discovered that the above problems can be solved by use of thin film magnetic rod element exhibiting single domain switching properties and operating in substantially an axial mode in a well balanced two element per bit memory organization. Typically, a rod having a thin magnetic film of four oersteds coercivity and a hysteresis loop squareness of 0.8 to 0.9 can be employed for such non-destructive operation.

Accordingly, it will now be evident from FIG. 4 that any of the three possible combinational states written into elements A and B of a typical bit in accordance with the invention as shown in FIG. 2 can be read out without destruction thereof ($P_2 \rightarrow P_5 \rightarrow P_2$) by the application of a read pulse $I_R'$ appropriately chosen for non-destructive operation. As for FIG. 3, the non-destructive mode produces a positive output signal for the combinational state of only element B partially switched as shown in graph I, a negative output signal for the combinational state of only element B partially switched as shown in graph II, and no output signal for the combinational state of neither element A nor B partially switched.

Having explained how a typical bit comprised of elements A and B, as illustrated in FIG. 2, can be utilized to provide for the storage of a binary or ternary digit with either destructive or non-destructive read out therefrom, it will next be described with reference to FIGS. 5–9 how the memory of FIG. 1 is arranged and organized so as to permit writing and both destructive and non-destructive reading with respect to selected digits in a manner which achieves a high degree of noise cancellation.

Considering first the connection and arrangement of the word windings, it will be understood from FIGS. 1, 2 and 5 that the return path for the word winding 16 on each rod structure 15 may advantageously be provided by utilizing the inner conductive substrate 13 to which the back end of the word winding **16*b* (FIGS. 1 and 7) is suitably connected at the back of the rod, such as by soldering. Then, by providing a lead wire 13*a* connected to the inner substrate 13 at the front of each rod structure, the two leads 13*a* and 16*a*** will be available at the front of each rod structure for interconnection in a conventional linear selection word line arrangement, as illustrated in FIG. 5.

It is to be noted that the use of the inner conductive substrate 13 of each rod structure 15 as a return path as just described not only eliminates the need for an additional return path, but also provides a circular or transverse field (which is in addition to the axial field) which reduces the axial switching field required so that a smaller read and write current can be used (this is true for both destructive and non-destructive modes). But most importantly, the circular or transverse magnetic field produced by current flow in the inner substrate 13 acts to cancel the external or stray circular magnetic field produced around each rod by the word line and the pitch of the word windings, thereby reducing this type of inter-rod coupling. It may also be noted that inter-rod coupling due to the stray axial field is already greatly reduced, since the cross-sectional area of each rod is so small (of the order of .007 inch) that it will couple very little of the axial field of an adjacent rod.

It will next be explained how the linear selection word line arrangement of FIG. 5 operates to permit a particular word line or a rod structure to be selected for receipt of a read current ($I_R$ or $I_R'$) or a write current $I_W$. It will be seen in FIG. 5, that the leads **16*a* from the rod structures in each of the six rows are connected together and to a respective one of the six row grounders $R_1$–$R_6$, while the leads 13*a* from the rod structures in each column are connected together and to a respective one of the six column drivers $C_1$–$C_6$ through a respective pair of oppositely poled diodes 17 and 18. Column drivers $C_1$–$C_6$ are constructed and arranged to operate in response to a signal 24*a* from a column selector 24 to cause a selected column driver to provide a DRO (destructive read out) current $I_R$, a NDRO (non-destructive read-out) current $I_R'$, or a write current $I_W$, in accordance with corresponding signals applied to column selector 24**. Row grounders $R_1$–$R_6$ are constructed and arranged to operate during read and write intervals to ground a selected row line, whereby to provide a completed path for the current provided by the selected column driver.

It will be understood that such a connection of windings as shown in FIG. 5 (conventionally referred to as a linear selection arrangement) permits the word windings of a single predetermined rod word line **13*a*, 16*a* to be selected to receive a read or write current. This is accomplished by activating the column driver and row grounder which correspond to the row-column coordinates of the rod structure which is to be selected. For example, selection of column driver $C_1$ and row grounder $R_1$ during a reading operation will result in a read current ($I_R$ or $I_R'$) flowing only in the word winding of the rod structure in row 1 and column 1, since only this word winding will have a completed path for the flow of read current ($I_R$ or $I_R'$) from $C_1$ to $R_1$. Also is well known with regard to linear selection systems, diodes 17 and 18** (one for the read current $I_R$ or $I_R'$ and the other for the write current $I_W$) are provided for each column driver in order to prevent sneak currents from flowing in unselected lines.

From the foregoing description of FIG. 5, it should now be evident that the read and write currents $I_R$ and $I_W$ required during reading and writing into and out of the binary digits or bits on a selected rod structure (as previously described) may readily be provided in a conventional manner. It is merely necessary to design the column drivers and row drivers so as to be individually selectable (such as by row selector 23 and column selector 24 in FIG. 5) to supply read and write currents $I_R$ and $I_W$ during respective read and write periods in accordance with the row-column coordinates of the selected rod structure.

Now that the linear selection interconnection arrangement of the rod word windings has been explained, the interconnection arrangement employed for the digit-sense windings will next be considered with reference to FIGS. 6–13. It will be remembered that the digit-sense windings perform the digit function during writing and the sensing function during reading so that the interconnection arrangement must take this into account. Also, the interconnection arrangement must provide for appropriate noise cancellation which, as will shortly become evident, is provided to an extremely high degree. Binary operation will be considered first followed by a description of the modifications required for ternary operation.

Referring to FIGS. 6–9, illustrated therein is a digit-sense winding arrangement suitable for two element per bit binary storage using the combinational states I and II of FIGS. 3 and 4 in which the partial switching of one element represents one binary digit and the partial switching of the other element represents the other binary digit. For the purposes of FIGS. 6–9, it will be assumed that a "1" is represented by element B partially switched, and a "0" by element A partially switched, and the "1" and "0" designations in FIGS. 6–9 are provided accordingly. FIG. 6 shows the winding arrangement for the digit-sense solenoids in digit planes $D_1$, $D_3$ and $D_5$, while FIG. 7 shows the winding arrangement for the digit-sense solenoids in digit planes $D_2$, $D_4$ and $D_6$, the digit planes being located as shown in FIG. 1. As indicated in FIGS. 1, 6 and 7 the solenoids in each digit plane are wound serially in each row, and the return wire for each row (such as indicated at 29 in FIGS. 1 and 7) is looped back along a path adjacent the solenoid interconnecting wires of the same row. By so doing, circular magnetic fields produced by intersolenoid wires in each row will be substantially cancelled in a manner similar to that achieved using the inner conductive substrate 13 as the return path as was described previously. To provide even further magnetic field cancellation, the return wire for each individual solenoid (indicated by numeral 28 in FIGS. 1 and 7) is perpendicularly returned adjacent and in contact with its respective solenoid so as to approximately cancel out the circular magnetic field produced by the pitch of the solenoid.

Continuing with the description of the digit-sense winding arrangement, it will be seen from FIGS. 6 and 7 that, in each digit plane, all of the odd rows ($r_1$, $r_3$ and $r_5$) of digit-sense windings are connected together to form a first series string (across points A and C in FIG. 6 and points F and H in FIG. 7), and all of the even rows ($r_2$, $r_4$ and $r_6$) of digit sense windings are connected together to form a second series string (across points B and E in FIG. 6 and G and J in FIG. 7). In addition, as indicated by appropriate "1" and "0" designations, the arrangement of digit-sense windings is such that, in digit planes $D_1$, $D_3$ and $D_5$ illustrated in FIG. 6, the digit-sense windings in odd rows are associated with the "1" bistable element of their respective binary digits, while the digit-sense windings in even rows are associated with the "0" bistable element of their respective binary digits. In digit planes $D_2$, $D_4$ and $D_6$ illustrated in FIG. 7, it will be seen that the opposite "1" and "0" designations exist, the odd row digit-sense windings being associated with the "*o*" bistable elements of their respective binary digits, and the even row digit-sense windings being associated with the "1" bistable elements of their respective binary digits. The resulting rod structure arrangement of "0" and "1" bi-stable elements provided by the digit-sense winding arrangement of FIGS. 6 and 7 is illustrated in FIG. 8 for an odd row rod structure **15*a*, and for an even row structure 15*b***.

The manner in which the above-described digit-sense winding arrangement is connected to a sense amplifier in accordance with the invention so as to achieve a high degree of noise cancellation will next be considered with reference to FIG. 9. It will be understood that since each word is the exemplary matrix illustrated in FIG. 1 has three binary digits or bits, three sense amplifiers are required, one for each binary bit. More specifically, digit planes $D_1$ and $D_2$ corresponding to bit 1 have their digit-sense windings connected to a bit 1 sense amplifier, digit planes $D_3$ and $D_4$ corresponding to bit 2 have their digit-sense windings connected to a bit 2 sense amplifier, and digit planes $D_5$ and $D_6$ corresponding to bit 3 have their digit-sense windings connected to a bit 3 sense amplifier. While FIG. 9 illustrates the sense amplifier connection for only planes $D_1$ and $D_2$ corresponding to bit 1, it will be understood that the digit planes for bits 2 and 3 are connected to their respective bit sense amplifiers in a similar manner. Since digit planes $D_1$, $D_3$ and $D_5$ are the same, digit planes $D_3$ and $D_5$ will be connected to their respective bit sense amplifiers in the same way as illustrated for digit plane $D_1$ in FIG. 9; also, since digit planes $D_2$, $D_4$ and $D_6$ are the same, digit planes $D_4$ and $D_6$ will be connected to their respective bit sense amplifiers in the same way as illustrated for digit plane $D_2$ in FIG. 9.

Now considering FIG. 9 in detail, it may be noted at the outset that the points designated by letters A, B, C, E, F, G, H and J in FIG. 9 correspond to like-lettered points in FIGS. 1, 6 and 7, thereby permitting each series string of digit-sense windings to be easily identified. For example, the series-connected string of 18 "1" digit-sense windings in odd rows of digit plane $D_1$ shown connected across points A and C in FIG. 9 represents the series-connected string of digit-sense windings in odd rows $r_1$, $r_3$ and $r_5$ in FIG. 6, which are also shown connected across points A and C and will be seen to comprise 18 "1" digit-sense windings as designated in FIG. 9.

The sense amplifier coupling means provided between the digit-sense windings of each bit and its respective bit sense amplifier may typically comprise a sense amplifier transformer 50 as indicated for the bit 1 sense amplifier in FIG. 9. The transformer 50 has three windings 51, 52 and 53, a "dot" being provided at one end of each transformer winding in a conventional manner to indicate the winding polarity. For the sake of this description, the "dot" will be considered to represent a positive polarity. As shown in FIG. 9, winding 51 is connected across points F and G, winding 52 is connected across points A and B (points A and G and points B and F being connected in the same polarity sense), and winding 53 is fed to the sense amplifier. Windings 51 and 52 are center-tapped and each center tap is connected to circuit ground through an impedance $Zo/2$, where $Zo$ is the characteristic impedance of the respective digit-sense lines connected thereto, such impedance terminations serving to prevent unwanted reflections.

At the right in FIG. 9, the manner in which digit current is applied to the digit-sense windings of planes $D_1$ and $D_2$ is illustrated. It will be seen that digit plane $D_1$ is provided with a driver 40 and digit plane $D_2$ is provided with a driver 60, each driver being capable of providing an output current pulse $2I_D$ in response to a signal received from a digit plane selector 75. It will be understood that only one of the drivers 40 and 60 is activated by the selector 75 during a writing interval, depending on whether a "0" or a "1" is to be written into the respective bit. As indicated in FIG. 9, the digit current $2I_D$ produced by each digit driver when activated is fed in parallel to the odd an even digit-sense windings of the respective plane through respective suitably matched isolating diodes (41 and 42 for digit plane $D_1$ and 61 and 62 for digit plant $D_2$). Since the driver digit current of $2I_D$ divides equally between the odd and even series-connected strings of digit-sense windings, the resulting digit current flowing in each digit-sense winding of the selected digit plane will be of value $I_D$ in accordance with the previously described writing operation. An impedance of $2Zo$ (where $Zo$ is again the characteristic impedance) is connected across point C and E and across points H and J in FIG. 9, which is done in order to provide proper line terminating impedances which will eliminate reflections.

It is to be understood that instead of feeding the output of the digit drivers $D_1$ and $D_2$ to their respective series strings via diodes 41, 42, 61 and 62 as shown in FIG. 9, these diodes could be eliminated, in which case the drivers $D_1$ and $D_2$ would be fed to their respective series strings by connecting the output of each driver to approximately the center of a respective one of the impedances $2Zo$, as illustrated for the $D_1$ driver 40 in FIG. 9*a*.

With the above description of the matrix and its winding arrangement in view, the overall operation of the matrix will now be illustrated by describing an example of typical operation involving the rod structure in row 1 and column 1, which will be assumed to store the three-bit word 101.

Operation may be considered to be initiated by the appearance of either a NDRO or DRO read signal (depending on whether non-destructive or destructive read out is desired) which is applied to the row selector 23 and the column selector 24 in FIG. 5 along with respective row and column data to permit selection of the desired row grounder and column driver during the reading operation. Since the rod structure in row 1 and column 1 is the selected one in the present example, the row selector 23 will select row grounder $R_1$ while the column selector 24 will select column driver $C_1$. As a result, a read current ($I_R$ or $I_R'$) will flow from column driver $C_1$, through its respective diode 17, through the word winding 16 (see FIGS. 1, 2 and 8) of the rod structure in column 1 and row 1, and back to circuit ground through row grounder $R_1$. The effect of a DRO read current $I_R$ flowing in the word winding 16 of the selected rod structure is to cause all of the six magnetic rod elements thereon to end up at $P_0$ as shown in graphs I and II of FIG. 3, while a NDRO read current $I_R'$ leaves each of the six magnetic rod elements in the same state at either $P_0$ or $P_2$, as shown in graphs I and II of FIG. 4.

Since in the present example it is assumed that the row 1, column 1 rod structure stores the word 101, the "1" bistable element of bit 1, the "0" bistable element of bit 2, and the "1" bistable element of bit 3 will each be at $P_2$ prior to reading and each will thus induce an output signal in its respective digit-sense winding in response to the applied read current, whether $I_R$ or $I_R'$. Considering only bit 1 for the moment, it will be understood from FIGS. 6, 7 and 9 that the output pulse induced in the "1" digit sense winding of bit 1 of the row 1, column 1 rod (which is in an odd row) will appear in the series string A–C of digit plane $D_1$. Since the series string A–C is connected to the dotted end of transformer winding 52 in FIG. 9, the signal induced in series string A–C will cause a positive "1" output signal (as typically illustrated in graph I of FIGS. 3 and 4) to be applied to the bit 1 sense amplifier from transformer winding 53 to thereby indicate the storage of a "1" in bit 1 of the selected word. Since bit 3 also contains a "1," the bit 3 sense amplifier will similarly receive a positive signal from series string A–C of digit plane $D_5$, via the respective sense amplifier transformer.

With regard to bit 2 of the selected word, which is assumed to store a "0," the output signal induced in its respective digit-sense winding will appear in the series string F–H of digit plane $D_3$. Since series string F–H is applied to the undotted end of its respective bit 2 transformer winding 51 (as will be noted in FIG. 9 for digit plane $D_2$), a negative "0" output signal (as typically illustrated in graph II of FIGS. 3 and 4) will be applied to the bit 2 sense amplifier via the sense amplifier transformer 50 to indicate the storage of a "0" in bit 2 of the selected word.

It will be understood from FIG. 9 that if a rod structure in an even row were the selected one (instead of the assumed row 1, column 1 rod which is in an odd row) and if bit 1 of such an even rod were assumed to store a "1," then the output signal would appear in series string G–J, and since string G–J is applied to the dotted end of transformer winding 51, a "1" output signal (FIG. 10) would be applied to the bit 1 sense amplifier indicative of a stored "1"; correspondingly, if such an even rod were to store a "0" in bit 1, then the output signal would appear in series string B–E, and since string B–E is fed to the undotted end of the respective transformer winding 52, a negative "0" signal (FIG. 10) would be applied to the respective bit sense amplifier indicative of a stored "0."

So far in this example, the paths of the output signals applied to the respective bit sense amplifier during reading have been traced and it has been shown how, during reading of a selected word, a positive "1" output signal (FIG. 10) is applied to each respective bit sense amplifier if the corresponding bit stores a "1," and negative "0" output signal (FIG. 10) if the corresponding bit stores a "0."

It willl be understood that if a NDRO reading operation is performed on the selected rod, as typically illustrated in graphs I and II of FIG. 4, then the stored information is maintained, no writing operation is required, and operation may immediately proceed to another reading operation. If a DRO reading operation is performed, a writing operation is necessary before proceeding to the next reading operation in order to restore the destroyed data, or to write in new data. Such a writing operation may be initiated following the DRO reading operation by applying a write signal to the row selector 23 and column selector 24 in FIG. 5, along with respective row and column data to permit selection of the desired row grounder and column driver. Since the rod structure in row 1 and column 1 is the selected one in the present example, the row selector 23 will select row grounder $R_1$, while the column selector 24 will select column driver $C_1$, causing a write current $I_W$ to flow through the word winding 16 (FIGS. 1, 2 and 8) of the selected rod structure in row 1 and column 1.

It will be remembered that neither the write current $I_W$ nor the digit current $I_D$, by itself, is sufficient for partial switching, and that the coincidence of both is necessary. Accordingly, having explained in the previous paragraph how the write current $I_w$ is obtained, reference is now directed to FIG. 9 which illustrates how the digit current $I_D$ is obtained for a typical bit.

It will be seen in FIG. 9 that the write signal (which may be the same as applied to the row selector 23 and column selector 24 in FIG. 5) is also applied to a digit plane selector 75 along with digit plane data to indicate, in accordance with the word to be written (assumed to be 010), which of the two digit plane drivers provided for each bit (such as $D_1$ and $D_2$ for bit 1) is to be selected during writing. The manner in which digit current is caused to flow in the proper "0" or "1" digit-sense winding of each bit of the selected word will now be illustrated by considering how it is accomplished for bit 1, which the present example assumes is to have a "0" written therein.

Initially, it is to be noted that the bit 1 "0" digit winding of the row 1, column 1 rod structure is located in row 1 of digit plane $D_2$ (FIG. 7), so as to thereby be in the series string F–H of FIG. 9. Consequently, in order to write a "0" in bit 1, the digit plane selector 75 will select the $D_2$ driver 60, which in turn will cause a digit current $I_D$ to flow in the series string F–H containing the bit 1 "0" digit-sense winding; the sum of the write current $I_W$ and the digit current $I_D$ will then be sufficient to drive the respective "0" bistable element of bit 1 to $P_2$ in FIG. 3 to thereby write a "0" in bit 1. Also, where non-destructive read out is to be employed, it has been found preferable to provide an inhibiting current $-2I_D$ from the unselected driver, which in the above illustration would be $D_1$ driver 40. It will be noted that selection of the $D_2$ driver 60 to provide the aiding current not only causes a digit current $I_D$ to flow in the digit-sense winding of the selected rod, but also the other digit-sense windings in the series string F–H, as well as the digit-sense windings in string G–J. Likewise selection of the $D_1$ driver 40 to provide the inhibiting current $-2I_D$ will cause a digit current of $-I_D$ to flow in series strings A–C and B–E. However, such digit current flow will not cause unwanted switching, since the digit current by itself is insufficient to cause switching.

It will be understod that if it were desired to write a "1" in bit 1 instead of a "0," then the digit plane selector 75 would select the $D_1$ driver 40 instead of the $D_2$ driver 60, causing a digit current $I_D$ to flow in series string A–C which contains the "1" digit-sense winding of bit 1 of the selected row 1, column 1 word.

It is also to be understood that if the selected word were in an even row, instead of an odd row, and if it were desired to write a "1" therein, then the $D_2$ driver 60 would be selected to cause a digit current $I_D$ to flow in series string G–J which contains the "1" digit-sense winding of bit 1. If, on the other hand, it were desired to write a "0" in bit 1 of such an even rod, then the $D_1$ driver 40 would be selected to cause a digit current to flow in series string B–E which contains the "0" digit-sense winding of bit 1.

From the foregoing it will be evident that at the end of the writing period the desired word will have been written into the selected rod structure in row 1, column 1 in accordance with the selection of digit drivers made by the digit plane selector 75. Since it is assumed the full word 010 is to be written into the row 1, column 1 rod structure, which is in an odd row, digit drivers $D_2$, $D_3$ and $D_6$ will be selected during the writing operation by digit plane selector 75 to provide an aiding current $2I_D$, while digit drivers $D_1$, $D_4$ and $D_5$ will either remain unselected, or will be caused to provide an inhibiting current of $-2I_D$.

Now that typical operation of the memory of FIG. 1 has been described for both destructive and non-destructive modes, it is of considerable importance to note that the winding arrangement thereof as disclosed in FIGS. 5–9 additionally provides for a very high degree of noise cancellation, whereby reliable operation is obtained for both destructive and non-destructive modes.

As far as inter-rod coupling due to stray axial and circular magnetic fields is concerned, it has already been explained how the use of a small diameter rod and the provision of a return path in close proximity to the forward path greatly reduces such inter-rod coupling and permits a high packing density to be obtained. However, there are other forms of coupling match produce unwanted signals or noise which must be cancelled out if the resultant noise is to be kept small, such as the noise arising as a result of capacitive and inductive coupling between word lines and digit-sense lines. While techniques—such as the use of strobing, common mode rejection and noise cancelling lines—can help reduce noise to some extent, considerable noise still remains, primarily because of the difficulty of obtaining a complete cancellation at each instant of time without degrading the output signal.

In the preferred embodiment of the invention being described herein, advantage is taken of the formation of each binary digit as two adjacent highly uniform bistable elements on the same rod structure to provide a noise cancellation arrangement, as illustrated in FIGS. 7–9, which results in an extremely high degree of noise cancellation within each binary digit, which is in addition to the usual common mode noise cancellation, whereby the entire memory as a whole has a very low noise figure. In other words, the digit-sense solenoids in each digit plane are connected in common mode rejection fashion, and in addition, two bits-sense solensoids of each binary digit are connected in an opposite polarity sense. Thus, when the various possible sources of noise in a magnetic memory matrix are considered and their effect is traced in the inter-connection arrangement illustrated in FIGS. 7–9, it will become evident that not only is the usual common mode rejection provided, but also, noise which is generated in a digit-sense winding associated with one bistable magnetic element of a selected rod is automatically cancelled out by a substantially equal and opposite noise signal generated in the digit-sense winding associated with the other bistable magnetic element of the same binary digit or bit.

It will be understood from the previous description in connection with FIGS. 3 and 4 that, instead of representing the "1" and "0" states of a binary bit by the combinationa states illustrated in graphs I and II for which a "1" or "0" is represented by the particular one of the two elements of a bit which is partially switched, a representation can be employed for which one bistable element always remains in the read saturation state, while the other bistable element is left in the read saturation state to represent a "0," or partially switched to represent a "1." For such a representation, the same basic digit-sense winding arrangement can be employed as illustrated in FIGS. 6 and 7 with the difference that all the digit-sense windings in planes $D_1$, $D_3$ and $D_5$ are "1" windings and all the digit-sense windings in planes $D_2$, $D_4$ and $D_6$ are "0" windings so that every rod structure in the matrix will have a "1"–"0" arrangement as illustrated by rod structure 15*a* in FIG. 8. In such an arrangement the "0" digit-sense windings always receive no digit current (or an inhiiting digit current as is preferred for non-destructive operation), and their associated bistable magnetic elements are therefore never switched out of the read saturation state; only the "1" digit-sense windings in planes $D_1$, $D_3$ and $D_5$ receive aiding digit current in such an arrangement.

The manner of connection of the digit-sense windings to their respective bit sense amplifiers for this modified type of operation now being considered may be as illustrated in FIG. 10 for digit planes $D_1$ and $D_2$. FIG. 10 is arranged similar to FIG. 9, and the same letters A, B, C, E, F, G, H and J are employed for ease of understanding and comparison. It will be understood from FIG. 10 that, when a bit stores a "1," an output signal (which may either be positive or negative) will be applied to the sense amplifier, via the sense amplifier transformer in response to an applied read current ($I_R$ or $I_R'$); on the other hand, if the bit stores a "0," a negligible output signal will be produced, since both bistable elements will be in the read saturation state.

As far as writing is concerned in the arrangement of FIG. 10, since aiding digit current is only applied to the "1" digit-sense windings, only one digit driver is required for each bit, as illustrated in FIG. 10 by the bit 1 driver 70 which feeds the "1" digit-sense winding strings A–C and B–E. The digit selector 75 in FIG. 9 may then become the bit driver selector 80 shown in FIG. 10 having three outputs (one for each bit driver). The bit driver selector 80 operates during writing to select only those bit drivers whose respective bits are to have a "1" written therein. If it is desired that the "0" digit-sense winding strings F–H and G–J receive an inhibiting digit current when the corresponding "1" digit-sense winding strings A–C and B–E receive aiding digit current (as is preferred for non-destructive operation), then the same digit plane selector 75 of FIG. 9 may be employed in FIG. 10 with an additional bit 1 driver (not shown) being provided for applying inhibiting digit current to the "0" digit-sense winding strings F–H and G–J.

It is further to be noted with respect to FIG. 10 that, by considering the various possible sources of noise and tracing their effect in the sense amplifier, it will become evident that this modified sense amplifier connection arrangement is able to achieve essentially the same high degree of noise cancellation as is achieved by the arrangement of FIG. 9.

Having described how binary operation is provided in both destructive and non-destructive read out modes in accordance with the invention, it will next be explained how each bit comprised of rod elements A and B (FIG. 2) may be employed for ternary storage in both destructive and non-destructive read out modes, thereby permitting a very significant reduction in the required number of rod elements and in the associated driving and sensing circuitry with only a relatively small increase in associated logic as a result of the requirement for binary-to-ternary and ternary-to-binary conversion. Of course, if such conversion is not required, an even greater savings results.

As previously explained in connection with FIGS. 3 and 4, a ternary digit may be stored in the elements A and B of each bit by employing the three combinational states illustrated in graphs I, II and III—that is: only element B partially switched which will be designated as "1"; only element A partially switched which will be designated as "−1"; and neither element A nor B partially switched which will be designated as "0." For such ternary storage the same memory word winding and selection means may be employed as illustrated in FIG. 5. Also, the same digit-sense winding arrangement may be employed as illustrated in FIGS. 6–8, except that the digit plane selector 75 in FIG. 9 is additionally constructed and arranged to operate in response to the applied digit plane data (which is in ternary form) to cause activation of the digit drivers for each pair of odd and even digit planes so as to permit any selected one of the three ternary digit values "0," "1" or "−1" to be written into the elements of the selected bits. For example, for the typical pair of odd and even digit planes $D_1$ and $D_2$ illustrated in FIG. 9, a "1" and "−1" is written in the same manner as described for the binary digits "1" and "0"—that is, for the "1" the $D_1$ driver 40 is activated to provide aiding digit current, while the $D_2$ driver is either not activated, or else, is activated to provide an inhibiting digit current (the latter being preferable for non-destructive read out), and vice versa if a "−1" is to be written. To write the third ternary digit "0" in the selected bit of planes $D_1$ and $D_2$, all that need be done is for the digit plane selector 75 to cause neither of the $D_1$ and $D_2$ drivers to be activated so as to cause neither element of the selected bit to be partially switched.

For reading out of a memory having ternary data stored in each bit as just described, a destructive or non-destructive read current $I_R$ or $I_R'$ is applied in the same way as previously described for a binary system. The only difference is with regard to read out. Instead of merely detecting the presence of a positive or negative output signal at the input of each bit sense amplifier, the presence of no output signal (or negligible output signal) is additionally detected as an indication of the storage of the third ternary digit, as illustrated by the graph of FIG. 11.

The considerable economy obtainable by using ternary storage in the memory instead of binary storage will now be illustrated in connection with FIGS. 12, 12*a*, 13 and 13*a* which show how a word comprised of three binary digits can be converted to a word comprised of two ternary digits for storage in ternary form in the memory, and how such a word read out from the memory as two ternary digits can be reconverted back to a word containing three binary digits. Only the pertinent digit circuit portions are illustrated, since read and write currents may be applied to the word lines in the same manner as previously described in connection with FIG. 5 for both binary and ternary storage. It will be understood that the digit circuitry may be considerably reduced, since a word in ternary form requires only two bits as compared with the three bits required for a word in binary form, thereby permitting four digit planes to store the same amount of data in ternary form as can be stored in six digit planes using binary. Thus, for this description, only the four digit planes $D_1$ to $D_4$ are necessary, eliminating the need not only for digit planes $D_5$ and $D_6$, but also the driving and sensing means associated therewith.

FIG. 12 illustrates in detail the design of a ternary digit plane selector 175 which may be employed for the digit plane selector 75 in FIG. 9 when it is desired to store data in the memory in ternary form. It will be assumed that the three binary digits which are to be written into the selected elements of digit planes $D_1$ to $D_4$ in ternary form are initially obtained from three flip-flops $B_1$, $B_2$ and $B_3$, each of which provides both true and false outputs of the binary data stored therein, the true output being unprimed (e.g. $B_1$) and the false output being primed (e.g. $B_1'$).

It will be understood from FIGS. 9, 12 and 12*a* that when the write signal W appears, the flip-flop outputs $B_1$, $B_1'$, $B_2$, $B_2'$, and $B_3$, $B_3'$ in FIG. 12 are logically combined by AND gates 176 and OR gates 178 in accordance with the table of FIG. 12*a* so as to activate appropriate ones of the $D_1$, $D_2$, $D_3$ and $D_4$ drivers of respective digit planes $D_1$, $D_2$, $D_3$ and $D_4$ to provide aiding digit current which will result in writing two ternary digits $T_1$ and $T_2$ therein corresponding to the binary data contained in flip-flops $B_1$, $B_2$ and $B_3$. For example, if $B_3$, $B_2$ and $B_1$ are respectively 110, then digit drivers $D_2$ and $D_3$ will be activated to provide aiding digit currents to digit planes $D_2$ and $D_3$ to store a "−1" ternary digit in the elements of the selected bit of digit planes $D_1$ and $D_2$, and a "1" ternary digit in the elements of the selected bit of digit planes $D_3$ and $D_4$. For the sake of simplicity, the embodiment of FIG. 12 does not provide for applying an inhibiting digit current to an unselected digit plane when the selected digit plane receives aiding digit current, as is preferable (but not essential) for non-destructive operation. However, the manner in which such an inhibiting digit current may be provided will readily be apparent to those skilled in the art from the description provided herein.

As mentioned previously, read out of a ternary digit may be accomplished in the same manner as for a binary digit by applying a read current ($I_R$ or $I_R'$) to the word line of the selected rod structure using the means illustrated in FIG. 5. As also mentioned previously in connection with FIG. 11, each of the two ternary digits of the selected word can be detected upon read out by noting whether the output of its respective bit sense amplifier transformer is postive, negative, or substantially zero, which conditions respectively correspond to the ternary values "1", "−1" and "0." FIGS. 13 and 13*a* illustrate how these sense amplifier transformer output signals may be fed via a respective bit sense amplifier to a ternary or binary converter 90 comprised of AND gates 92 and OR gates 94 in order to convert the selected word read out from the memory in ternary form back into binary form in flop-flops $M_1$ and $M_3$ in accordance with table 13*a*.

Considering FIGS. 13 and 13*a* in more detail, it will be understood that each of the bit 1 and bit 2 sense amplifiers is constructed and arranged to provide an output signal on only a first output line ($e_1^+$ for bit 1 and $e_2^+$ for bit 2) if its respective sense amplifier transformer applies a positive signal thereto, an output signal on only a second output line ($e_1^-$ for 1 bit and $e_2^-$ for bit 2) if its respective sense amplifier transformer applies a negative signal thereto, and no output signal on either of the first and second output lines if its respective sense amplifier transformer provides substantially no output signal (i.e. an output signal below a threshold value determined by noise considerations). As is conventional, each sense amplifier preferably includes strobing means responsive to an applied strobe signal S for permitting activation of these sense amplifier only for the particular period during a reading operation when an output signal can occur, thereby excluding noise and unwanted signals occurring at other times.

The three outputs of the ternary to binary converter 90 in FIG. 13 are applied to the set inputs of respective ones of the $M_1$, $M_2$ and $M_3$ flip-flops which are all initially in the "0" binary state as a result of being so set by a clear signal CL applied thereto at the beginning of each reading operation. Accordingly, if an $M_1$, $M_2$ or $M_3$ flip-flop receives a true logical level signal from the ternary to binary converter 90, the flip-flop is switched to the binary "1" state, and if the flip-flop receives a false logical level signal it remains in the "0" binary state. Thus, assuming the same example as used in connection with FIGS. 12 and 12*a*, the ternary digits $T_2T_1$ of the selected word will be respectively (1)(−1) so as to cause the $e_1^-$ and $e_2^+$ signals to occur to set flip-flops $M_3$ and $M_2$ to the "1" binary state while flip-flop $M_1$ remains in the "0" binary state, thereby recovering in flip-flops $M_1$, $M_2$ and $M_3$ the original 110 binary signals originally obtained from flip-flop $B_1$, $B_2$ and $B_3$ in FIG. 12.

The embodiments disclosed herein are capable of operating speeds of 10 megacycles for a full read-write cycle and 20 megacycles for non-destructive read cycles. However, the invetnion is not be to be considered as limited to these embodiments, since many changes may be made in construction and arrangement without departing from the scope of the invention. Accordingly, the invention should be considered as including all possible variations and modifications coming within the scope of the invention as defined by the appended claims.

What is claimed is:

1. In a non-destructive memory, a plurality of magnetic elements saturable in one or the other of two substantially opposite directions, writing means coupled to said elements for causing first selected ones thereof to reside in a saturation state in one of said two substantially opposite directions and second selected ones thereof to reside in a partially switched state in one of said directions, reading means for applying a magnetic field to selected ones of said elements, said magnetic field being chosen to be sufficient to temporarily drive a partially switched element towards saturation in one of said two directions but not sufficient to prevent return thereof to substantially the same partially switched state when said magnetic field is removed, and sensing means coupled to said elements for detecting the state of at least a selected one thereof based on its incremental permeability in response to the application of said magnetic field.

2. The invention in accordance with claim 1, wherein said reading means also includes optionally operable means for applying a substantially axial magnetic field to a selected element sufficient to drive an element in a partially switched state to a substantially axial saturation state.

3. The invention in accordance with claim 1, wherein said magnetic elements comprise thin magnetic films having a thickness of 500 to 10,000 angstroms.

4. The invention in accordance with claim 1, wherein two magnetic elements represent a digit and wherein said sensing means is constructed and arranged to detect the value of a selected digit by detecting the difference in incremental permeability between the two magnetic elements thereof.

5. The invention in accordance with claim 4, wherein said writing means is constructed and arranged to write a ternary digit in response to applied data by setting the two magnetic elements of a selected digit to one of the following conditions (1) both elements in the same state (2) only a particular one of the elements partially switched and (3) only the other one of the elements partially switched, and wherein said sensing means is constructed and arranged to detect a ternary digit by detecting one of the following (1) both elements have the same incremental permeability (2) one particular element has a greater incremental permeability and (3) the other element has a greater incremental permeability.

6. The invention in accordance with claim 5, wherein said writing means includes means for converting data in binary form into ternary form for writing a ternary digit, and wherein said sensing means includes means for converting the ternary data sensed back into binary form.

7. In a non-destructive memory, a plurality of rods, each rod having a rod-like substrate and a thin film of bistable magnetic material deposited thereon with a thickness of 500 to 10,000 angstroms and saturable in one or the other substantially axial directions, writing means coupled to said rods for causing first selected thin film magnetic portions thereof to reside in a substantially axial saturation state and second selected thin film magnetic portions to reside in a substantially axial partially switched state, reading means for applying a magnetic field to selected thin film magnetic portions, said magnetic field being chosen to be sufficient to temporarily drive a partially switched thin film magnetic portion towards a substantially axial saturation state but not sufficient to prevent return thereof to substantially the same substantially switched state when said magnetic field is removed, and sensing means coupled to said thin film magnetic portions for detecting the states of at least a selected one thereof in response to the application of said magnetic field.

8. The invention in accordance with claim 7, wherein said reading means also includes optionally operable means for applying a substantially axial magnetic field to a selected element sufficient to drive an element in a substantially axial partially switched state to a substantially axial saturation state.

9. The invention in accordance with claim 7, wherein two magnetic thin film portions represent a digit, wherein said writing means is constructed and arranged to write a ternary digit by causing only one or the other of the two elements of a selected digit to reside in a substantially axial partially switched state or both elements to reside in the same state, and wherein said sensing means is constructed and arranged to sense a ternary digit by producing an output signal of one polarity to represent one ternary digit value, an output signal of the other polarity to represent a second ternary digit value and negligible output signal to represent a third ternary digit value.

10. The invention in accordance with claim 7, wherein two magnetic thin film portions represent a digit, and wherein said sensing means is constructed and arranged to detect the value of the digit by detecting the difference in incremental permeability between the two magnetic thin film portions corresponding thereto.

11. The invention in accordance with claim 10, wherein the two magnetic thin film portions representing each digit are on the same rod immediately adjacent one another.

12. In a two element per digit non-destructive memory capable of storing a plurality of multi-digit words and of having a word read out therefrom, a plurality of rods each comprised of a rod-like substrate and a continuous thin film of bistable magnetic material uniformly deposited thereon with a thickness of 500 to 10,000 angstroms and saturable in one or the other substantially axial directions, a plurality of winding means coupled to respective thin film magnetic portions of said rods and arranged so that each digit is represented by a respective pair of thin film magnetic portions, writing means coupled to said winding means for writing digital data into a selected digit by causing each of the two thin film magnetic portions representative thereof to reside in either a substantially axial saturation state or in a substantially axial partially switched state, reading means coupled to said winding means for reading out a selected digit by applying a magnetic field to the magnetic thin film portions corresponding thereto, said magnetic field being chosen to be sufficient to temporarily drive a partially switched thin film magnetic portion towards a substantially axial saturation state but not sufficient to prevent return thereof to substantially the same substantially axial partially switched state when said magnetic field is removed, said winding means including a sense winding for each thin film magnetic portion, output detection means, and coupling means constructed and arranged to couple the sense windings of the thin film magnetic portions of each digit to said output detection means so as to detect the value of a digit based on the difference in incremental permeability between the thin film magnetic portions of each digit.

13. The invention in accordance with claim 12, wherein said reading means includes optional means for applying a magnetic field to the thin film magnetic portions of a selected digit sufficient to drive a substantially axial partially switched thin film magnetic portion to a substantially axial saturation state.

14. The invention in accordance with claim 12, wherein said writing means is constructed and arranged to write a ternary digit by causing only one or the other of the two elements of a selected digit to reside in a substantially axial partially switched state or both elements to reside in the same state, and wherein said sensing means is constructed and arranged to sense a ternary digit by producing an output signal of one polarity to represent one ternary digit value, an output signal of the other polarity to represent a second ternary digit value, and negligible output signal to represent a third ternary digit value.

15. The invention in accordance with claim 12, wherein said sense windings and their respective thin film magnetic portions are organized into digit planes such that a pair of digit planes contains the thin film magnetic portions corresponding to a particular digit of a word with one thin film magnetic portion of each digit in one digit plane and the other thin film magnetic portion in the other digit plane of the pair, and wherein said coupling means is constructed and arranged so that common mode noise rejection is obtained for sense windings in the same digit plane and so that the sense windings of the thin film magnetic portions of each digit are connected in an opposite polarity sense.

16. The invention in accordance with claim 15, wherein said writing means is constructed and arranged in conjunction with said winding means such that the thin film magnetic portions which are to be caused to reside in a substantially axial partially switched state receive the combination of a word magnetic field and an aiding digit magnetic field while the corresponding thin film magnetic portions of each digit which are to reside in a substantially axial saturation state receive the combination of a word magnetic field and an opposing digit magnetic field.

17. The invention in accordance with claim 16, wherein the two thin film magnetic portions constituting a digit are on the same rod immediately adjacent one another.

18. The invention in accordance with claim 16, wherein said winding means also includes a word winding for each thin film magnetic portion, and wherein said sense winding also serves as a digit winding.

19. In a two element per ternary digit memory, a large plurality of bistable magnetic elements, conductor means inductively coupled to said elements, a source of input binary data, conversion means coupled to said source for converting said binary data into ternary form, writing means coupled to said conductor means and responsive to said conversion means for writing a ternary digit in a selected pair of elements by setting the two elements to one of the following three combinational states (1) both elements in the same state (2) the first element in one state and the second element in another state and (3) the second element in said one state and the first element in said another state, means coupled to said conductor means for applying a reading magnetic field to a selected pair of elements, containing a ternary digit, said conductor means including a sense conductor for each element for producting an output signal in response to the application of said magnetic field to its respective element in dependence upon the state thereof, detection means coupled to the sense conductors for indicating the ternary digit stored in a selected pair of elements by detecting in which of the said three combinational states the selected pair of elements reside, and means coupled to said detection means for converting the detected ternary data into binary form.

20. In a two element per ternary digit memory, a large plurality of bistable elements, conductor means operatively coupled to said elements, writing means coupled to said conductor means and responsive to input data for writing a ternary digit in a selected pair of elements by setting the two elements to one of the following three combinational states (1) both elements in the same saturation state (2) the first element in one saturation state and the second element in a partially switched state and (3) the second element in said one saturation state and the first element in said partially switched state, reading means coupled to said conductor means for applying a reading energization to a selected pair of elements, and detection means coupled to said conductor means for detecting in which of the said three combinational states the selected pair of elements reside.

21. The invention in accordance with claim 20, wherein said bistable elements are magnetic, wherein said conductor means are inductively coupled thereto, and wherein said writing means and said reading means operate to apply a magnetic field to selected ones of said elements.

22. The invention in accordance with claim 21, wherein said elements are comprised of rod-like substrates having a thin film of bistable magnetic material coated thereon with a thickness of 500 to 10,000 angstroms and a hysteresis loop squareness of 0.8 or greater.

23. The invention in accordance with claim 21, wherein said magnetic elements are chosen in conjunction with said reading and writing means so as to provide for nondestructive reading.

24. The invention in accordance with claim 21, wherein said conductor means includes a sense conductor for each element, and wherein the sense conductors of the pair of elements constituting a ternary digit are coupled to said detection means in an opposite polarity sense.

References Cited

UNITED STATES PATENTS

| | | | |
|---|---|---|---|
| 2,998,594 | 8/1961 | Jones | 340—174 |
| 3,121,862 | 2/1964 | Ridenour et al. | 340—174 |
| 3,125,745 | 3/1964 | Oakland | 340—174 |
| 3,191,162 | 6/1965 | Davis | 340—174 |
| 3,355,726 | 11/1967 | Koerner | 340—174 |
| 3,359,546 | 12/1967 | James | 340—174 |

BERNARD KONICK, Primary Eaminer

BARRY L. HALEY, Assistant Examiner